Aug. 22, 1961

W. P. CHRISTOPH 2,996,917

ELECTROLYTIC APPARATUS FOR TEMPERATURE
AND RADIATION MEASUREMENTS

Filed Feb. 13, 1958

INVENTOR.
W. P. CHRISTOPH

BY

ATTYS

Aug. 22, 1961

W. P. CHRISTOPH 2,996,917

ELECTROLYTIC APPARATUS FOR TEMPERATURE
AND RADIATION MEASUREMENTS

Filed Feb. 13, 1958

INVENTOR.
W. P. CHRISTOPH

BY

ATTYS.

United States Patent Office 2,996,917
Patented Aug. 22, 1961

2,996,917
ELECTROLYTIC APPARATUS FOR TEMPERATURE AND RADIATION MEASUREMENTS
Walter P. Christoph, Riverdale, Md., assignor to the United States of America as represented by the Secretary of the Navy
Filed Feb. 13, 1958, Ser. No. 715,164
12 Claims. (Cl. 73—355)
(Granted under Title 35, U.S. Code (1952), sec. 266)

The invention described herein may be manufactured and used by or for the Government of the United States of America for governmental purposes without the payment of any royalties thereon or therefor.

This invention relates generally to apparatus for indicating and measuring the rate of change of temperatures and heat radiation, and in particular to an electrolytic cell combined with a heat deformable member which is adapted to regulate the output of the cell in response to the rate at which the member receives heat.

In order to measure the rate of temperature change prior to this invention it was necessary to measure the absolute value of temperature at various intervals of time and from these values determine the rate of change. To determine this rate quickly, electronic circuitry which produces an output which is a derivative of the input was incorporated into the measuring apparatus to derive an output rate function. This method of determining the rate of heat transfer is unduly complicated since the temperature must be first detected and the difference in temperature at several points differentiated with respect to time to determine the rate of change of temperature.

Accordingly, it is an object of this invention to provide new and improved apparatus for directly indicating the rate of change of temperature or thermal radiation.

Another object of the invention is the provision of a new and improved electrolytic temperature detector which is rugged and compact.

A further object is the provision of a novel electrolytic apparatus for indicating and measuring changes in temperature of a system being controlled, which apparatus contains a wall deformable by the heat or radiation emanating from the system being measured.

These and many other objects will become more readily apparent when the following description is read in conjunction with the attendant drawings wherein like numerals designate like or similar parts throughout the several views and in which.

In brief, this invention comprises an electrolytic detector cell having a deformable member adjacent to the electrolyte solution of the cell. As the ambient temperature or incident radiation varies, the deformable member bows slightly thereby disturbing the electrolytic solution to produce a measurable output current from the detector cell in response to the rate of deformation of the member.

As used in this specification, the word "detector cell," "electrolytic cell," "electrolytic detector cell" refer to a device such as described in detail in my copending application Serial No. 451,317, filed August 20, 1954. Various types of other electrolytic transducers such as those utilizing electrokinetic or electro-osmosis phenomena are not within the scope of this invention, nor is the use of any such electrokinetic or electro-osmotic transducers contemplated in the practice of this invention.

Figure 1:
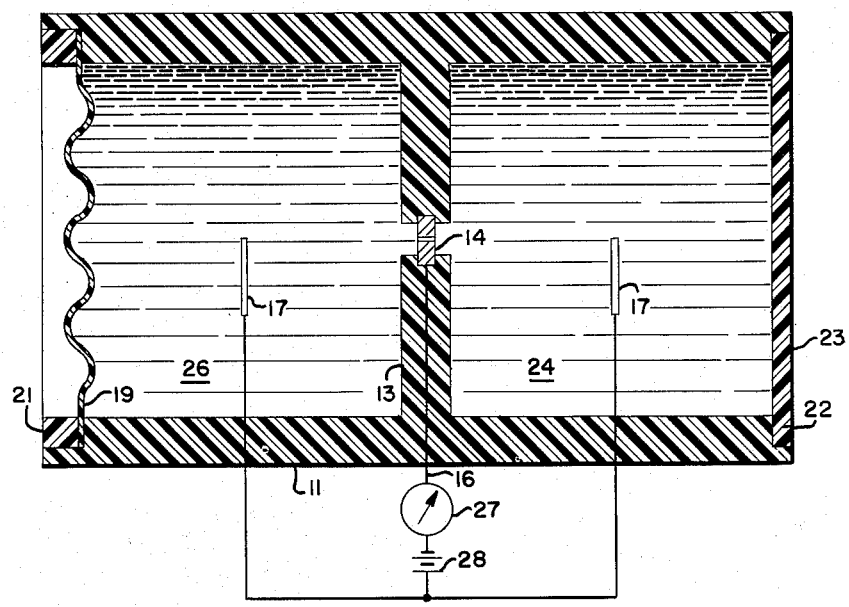
FIG. 1 is a rather diagrammatic representation of a simplified temperature detector embodying the principles of this invention.

Referring now with greater particularity to FIG. 1, the temperature rate of change apparatus comprises a casing 11 composed of polymonochlorotrifluoroethylene or other material which is inert to the electrolyte filling the casing. The electrolyte includes a system of potentially oxidizable and potentially reducible ions in a solvent. A suitable solution is an aqueous or an alcohol solution of $I_1^--I_3^-$ in which the $I_1^-$ is in large excess in accordance with the teachings of my copending application, Serial No. 451,317.

An apertured wall member 13 is disposed within the casing 11 dividing it into two chambers 24 and 26 filled with the electrolyte and an orifice electrode 14 is disposed in the aperture. This orifice electrode is electrically connected exteriorly of the temperature rate of change detector by an electrical lead 16.

A pair of biased electrodes 17 are disposed within the casing on opposite sides of wall member 13. These electrodes may be exteriorly connected so that they are at the same electrical potential. Regardless of whether the are at the same potential, it is necessary that they each be maintained positive with respect to the active orifice electrode 14 by suitable biasing means such as battery 28 if an $I_3^-$ system is the electrolyte. That is to say, if the reducible ion is the rate controlling ion, the active electrode must be the cathode.

A compliant diaphragm 19 is secured to one end of the casing by a suitable ring 21 while a deformable member or plate 22 is secured to the opposite end of the casing. Member 22 is composed of a heat absorbing material having low conductivity as for example, polymethylmethacrylate and is "aimed" so that the outer surface 23 receives heat or thermal radiant energy from the object being measured or regulated. As the monitored temperature increases, the outer layer 23 of the member 22 becomes heated and expands while the temperature of the inner layer remains constant due to the high heat absorbing capacity and low conductivity of the member. Accordingly, the outer layer increases in size and bows outwardly forcing the inner layer also to assume an arcuate position of smaller radius. This deformation of plate 23 although undetectable by the unaided eye, effectively increases the size of the chamber 24 formed between wall 13 and member 22 thereby drawing the electrolyte through electrode 14 and into this compartment. In the process, compliant diaphragm 19 flexes to equalize the pressure in compartment 24 and compartment 26 formed between diaphragm 19 and wall 13.

Because of the nature of electrolytic detector cells, a current proportional to the rate of flexure of member 22 is produced in the external circuit connecting electrode 14 and electrodes 17 in compartment 26 upon flow of the electrolyte through the orifice electrode. A suitable meter 27 may be incorporated into this circuit to indicate the magnitude of the current output. It should be noted that the output current is independent of the total amount of fluid flowing during a given time and is a function only of the rate of fluid flow and consequently the rate at which member 22 is deformed by the increase of the heat received thereby. The theory of operation of an electrolytic detector cell is described in greater detail in my copending application Serial No. 451,317 above mentioned.

It is to be understood that a relay may be substituted for meter 27 in order to provide a control system for correcting errors in the rate of temperature or radiation change of the system being regulated.

Figure 2:
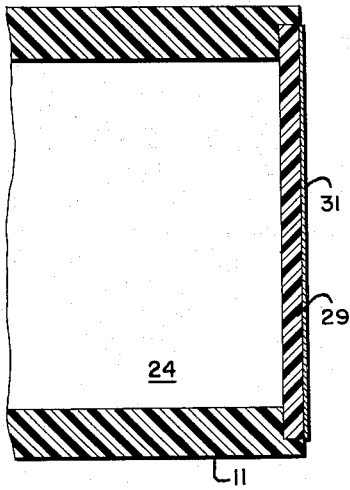
FIG. 2 represents a cross sectional view of a second embodiment of the deformable wall for use in detecting and measuring the rate of increase of temperature or radiation.
Figure 3:
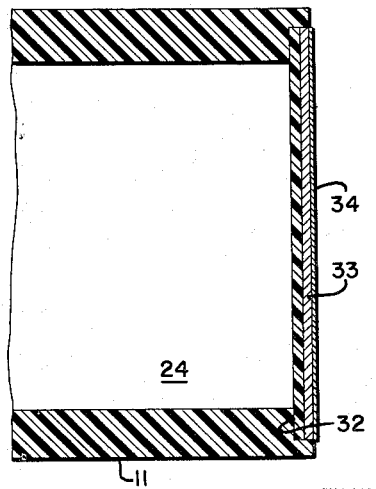
FIG. 3 represents a cross sectional view of a further modification of the deformable wall for use in detecting apparatus embodying the principles of the instant invention.

The deformable member may also be modified in the manner shown in FIGS. 2 and 3. In FIG. 2 is shown a more efficient deformable member especially adapted for detecting changes in radiant energy and including a plate 29 composed of a heat absorbing material having poor heat conductivity. A thin layer of flat black lacquer or the like indicated at 31 is coated on the outside surface of plate 29 to absorb all radiation incident thereon, thereby providing a greater temperature difference between the outer and inner surfaces of member 29. This increases the amount of heat induced warp or bow which increases the sensitivity of the apparatus.

In the modification shown in FIG. 3, the member is composed of two plates 32 and 33 having poor heat conductivity and good heat conductivity respectively. The plate 33 is coated on its outside surface with a layer of flat black lacquer 34. Accordingly, uniform temperature distribution is quickly provided throughout the outer plate 33. Since the inner plate 32 is a poor conductor and may advantageously have a high specific heat, it acts as an insulator so that as the ambient temperature increases, the outer plate 33 is quickly heated to the temperature of the surroundings while the inner plate remains at the temperature of the electrolyte within the casing. Therefore, the outer plate expands more rapidly forcing the entire member to warp or flex since it is secured at its rims by suitable adhesive to the casing 11.

Although the above-described embodiments function satisfactorily to indicate the rate of change of temperature increase, they cannot indicate an initial decrease in temperature since the deformable member is flat. Consequently, when the temperature decreases tending to diminish the size of the heat deformable member it becomes highly stressed but not bowed since any bow would have the effect of increasing rather than decreasing the distance between opposite edges of the member.

Figure 4:
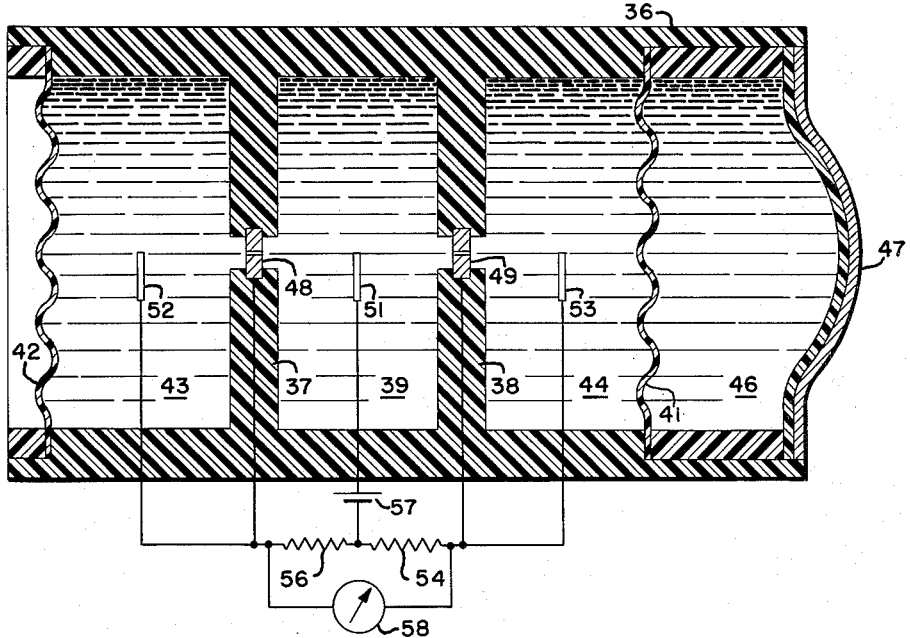
FIG. 4 is a section of a temperature rate of change apparatus which incorporates a thermally deformable member sensitive to increase and decrease of temperature.

The embodiment shown in FIG. 4 is capable of measuring both increases and decreases in the temperature or incident radiation received from the surroundings. In this embodiment the apparatus comprises a casing 36 having two spaced-apart apertured walls 37 and 38 therein. Between these walls is formed a compartment 39 having a concentrated electrolyte solution therein. Compliant diaphragms 41 and 42 are disposed within the casing and together with the walls 38 and 37 respectively define a pair of compartments 43 and 44 on either side of compartment 39; each containing a relatively weak electrolytic solution. A fourth compartment 46 containing an inert liquid is formed by diaphragm 41 and a temperature deformable member 47 which is secured to casing 36. The member 47 may be similar to the deformable members shown in FIGS. 1, 2 or 3 except that it is preformed into an outwardly bowed positoin so that it may flex inwardly or outwardly as the ambient temperatures decrease or increase, as the case may be. Disposed within the respective apertures of walls 37 and 38 are orifice electrodes 48 and 49. If the electrolyte is an $I_3^-$–$I_1^-$ solution, these electrodes must be biased negatively with respect to an electrode 51 disposed within the compartment 39 which contains concentrated electrolyte solution. The electrodes 52 and 53 in compartments 43 and 44 respectively are connected through resistors 54 and 56 to the negative terminals of the biasing battery 57 to aid in maintaining low electrolyte concentration in the chambers 43 and 44 respectively. A voltmeter 58 having a center zero is connected to orifice electrodes 48 and 49 to measure the voltage difference between them across resistors 54 and 56.

As the temperature increases due to radiation incident upon member 47, the member expands and initiates electrolyte flow from left to right within the casing. Electrolyte passes through orifice electrode 48 as it flows from compartment 43 to compartment 39, but this does not cause a flow of electric current in the left branch of the electric circuit because the electrolyte in compartment 43 is dilute. An equal quantity of concentrated electrolyte passes through electrode 49 from compartment 39 thereby causing electric current to flow in the right branch of the circuit. Accordingly, electrode 49 is brought to a higher potential than maintained at electrode 48 as indicated by meter 58. If the thermal radiation decreases, deformable member 47 contracts thereby causing electrolyte flow in the reverse direction and electrode 48 is brought to a higher potential than electrode 49 as indicated by reversal of the direction of the throw of the needle of meter 58. It should be apparent that meter 58 can be replaced by a polarized relay or the like if the apparatus is used to regulate and control temperature corrective devices as well as to indicate the rate of change of temperature.

The thermally deformable element 47 of the apparatus shown in FIG. 4 is particularly suited for measurement of variations of radiant thermal energy. If ambient temperature rather than radiation is to be measured or controlled temperature variations of the fluid being controlled must be conveyed by conduction to the front face of this member and the device may be linked directly to the fluid. In the event that the temperature of a solid is being measured or controlled, a heat conducting rod may be used to convey the temperature change from the source to the apparatus of this invention. Inert liquids are used in filling chamber 46 in order to allow a wider selection of material suitable for the construction of member 47. Since the electrolyte solution is corrosive and tends to leach out impurities in the common materials of construction and since the operation of the detector cell is adversely effected by the presence of minute amounts of impurities in the electrolyte, only a few materials are suitable for fabricating the parts contacting the solution. By using an additional inert solution it is possible to use a variety of inexpensive materials for the member 47. However, this necessitates the use of an extra diaphragm 41 thereby tending to slow the response of the system somewhat due to the time constant inherent in the diaphragm. Accordingly, where rapid response is essential it may be desirable to omit the diaphragm 41 and the compartment 46 thereby reducing the time constant of the apparatus as a whole at the expense of increasing the cost of member 47.

Figure 5:
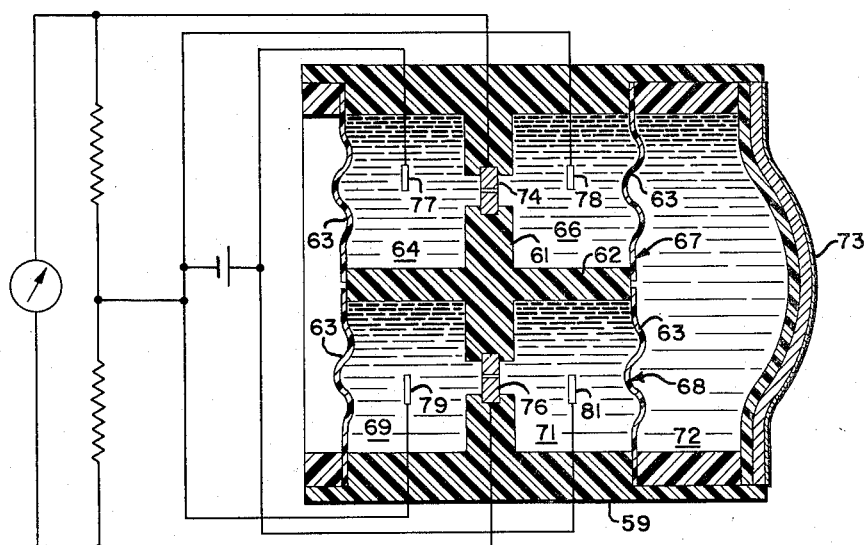
FIG. 5 is a view in section of a further modified indicator constructed in accordance with the teachings of this invention.

In FIG. 5 is shown a second arrangement responsive to both increases and decreases in temperature wherein the casing 59 has a double apertured wall 61 affixed therein. A transverse dividing member 62 is formed integral with the wall 61 between the apertures and together with the wall and the four diaphragms 63 defined a plurality of compartments in quadrature relation. The upper compartments 64 and 66 form an electrolytic cell 67 having a concentrated solution in compartment 64 and a dilute solution in the compartment 66. The lower cell 68 which includes compartments 69 and 71 is reversed, that is to say the concentrated solution is in the right compartment 71 and the dilute solution is in the left compartment 69 as viewed in the drawing. The device is shown provided with an optional fifth compartment 72 containing an inert liquid disposed adjacent to a heat deformable member 73. The orifice electrodes 74 and 76 are disposed within the apertures in wall 61 and are externally connected to the appropriate electrodes 77, 78, 79 and 81 respectively disposed in each of the compartments via the external electrical circuitry which connects the cells 67 and 68 in parallel for indicating the rate of increase or decrease in temperature. When the temperature is increasing the upper cell provides an output, while, conversely, the lower cell provides an output when the temperature is decreasing.

The invention provides a means for directly indicating and measuring changes of temperature or thermal radiation. The low voltage electrolytic detector cells require little standby power and are extremely sensitive to minute flow rates caused by slight flexure of the temperature distorted member.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A direct temperature rate of change indicator which comprises; a hollow body having a first open end and a second open end, a compliant diaphragm secured to said body at said first open end, a thermally deformable member secured to said body at said second open end and adapted to be deformed by changes in the rate of incident thermal radiation thereupon, said diaphragm and said member together with said body defining a closed container, an oxidation-reduction electrolyte substantially filling said hollow body for agitation by the thermal deformation of said member and an electrolytic detector cell disposed within said container and having external electrical circuitry for producing an output voltage proportional to the rate of deformation of said deformable member.

2. A temperature rate of change indicator according to claim 1 wherein said deformable member comprises an inner plate composed of heat absorbing material having low conductivity, an outer plate secured thereto and having high conductivity, and a black radiation absorbing coating deposited upon the face of said outer plate for receiving incident thermal radiation.

3. A temperature rate of change indicator according to claim 2 wherein said deformable member is preformed into a bowed shape.

4. A temperature rate of change indicator according to claim 1 wherein said deformable member is arcuate in cross section.

5. A directly acting temperature rate-of-change indicator comprising; a housing having an apertured wall therein, compliant diaphragm means secured to said housing and spaced from said wall, said wall and said diaphragm together defining a first compartment within said housing, a thermally deformable member secured to said housing at one end thereof and together with said wall forming a second interior compartment, said member positioned to receive heat from the surroundings, an electrolyte comprising potentially oxidizable ions and potentially reducible ions filling said compartments, a pair of exteriorly connected electrodes each disposed in one of the respective compartments, an orifice electrode disposed within the aperture in said wall and biased with respect to said first named electrodes, circuit means connecting said first named electrodes with said orifice electrode to provide an electrical output correlative to the thermal deformation of said thermally deformable member as the heat from the surroundings varies.

6. The indicator of claim 5 wherein the deformable member includes an exterior metallic plate secured to an interior plate of a heat absorbing material.

7. A temperature sensing device comprising; a hollow casing, a first apertured wall within said casing, a second apertured wall within said casing and spaced from said first wall to define a first compartment therebetween said compartment being substantially filled with a concentrated oxidation-reduction electrolytic solution, a diaphragm secured to said casing and together with said first wall defining a second compartment separated from the first compartment by said wall, a third compartment formed within said casing adjacent to said second wall on the side thereof opposite said first compartment, a dilute electrolytic solution filling said second and said third compartments, a positively biased electrode disposed within said compartment containing concentrated electrolyte, an orifice cathode disposed within the aperture in each of the respective walls, each cathode being electrically connected with said positively biased electrode thereby providing an output circuit, thermal responsive means for agitating the solutions within said casing in response to a variation in the rate of change of ambient temperature to produce an output voltage in said output circuit correlative to the variation in the rate of change, a pair of stabilizing electrodes each disposed in a respective dilute electrolyte compartment and being positively biased with respect to said cathode to maintain the low concentration of electrolyte within the respective compartments.

8. A thermal radiation sensing device comprising; a hollow casing, a pair of spaced diaphragms secured within said casing, a pair of apertured walls affixed within said casing between said diaphragms and together therewith defining a pair of mutually spaced electrolyte compartments, said walls also defining a central electrolyte chamber disposed between the electrolyte compartments, an orifice electrode disposed in the aperture of each wall, a biased electrode disposed within said central chamber, a concentrated oxidation-reduction electrolyte solution disposed within said central chamber, a dilute electrolyte disposed within each of said compartments, a thermally deformable member secured to the open end of said casing for receiving incident thermal radiation and together with one of said diaphragms defining a third compartment adjacent to one of said pair of compartments, an inert liquid filling said third compartment to provide a force transmitting medium between said member and said concentrated electrolyte in said chamber whereby said concentrated electrolyte is driven through one orifice electrode when thermal radiation incident upon said member increases and is driven through the other orifice electrode when the thermal radiation decreases, electric circuit means for externally connecting said orifice electrodes with said biased electrode to indicate the orifice electrode through which the concentrated electrolyte is flowing and the rate of flow therethrough.

9. A thermal radiation sensing device according to claim 8 wherein said thermally deformable member is pre-bowed.

10. The device of claim 9 wherein said thermally deformable member comprises an outer metallic plate having a radiation absorbing coating thereon and an interior plate composed of thermally insulating material secured thereto.

11. A temperature rate of change indicator comprising; a casing having a pair of oppositely oriented parallel connected electrolytic detector cells therein, circuit means for instantaneously indicating which cell is conducting, thermally flexible means secured to said casing, means operatively connecting said first means to said cells to render one cell conducting when said means is flexed in one direction and to render the other cell conducting when said means is flexed in the opposite direction.

12. A direct temperature rate of change indicator comprising; a hollow casing having at least one open end, a thermally deformable member secured to said casing at an open end thereof, an electrolytic detector cell disposed within said casing and fluidly connected to said member for producing an electrical output in response to deformation of said member.

No references cited.